Patented Oct. 20, 1936

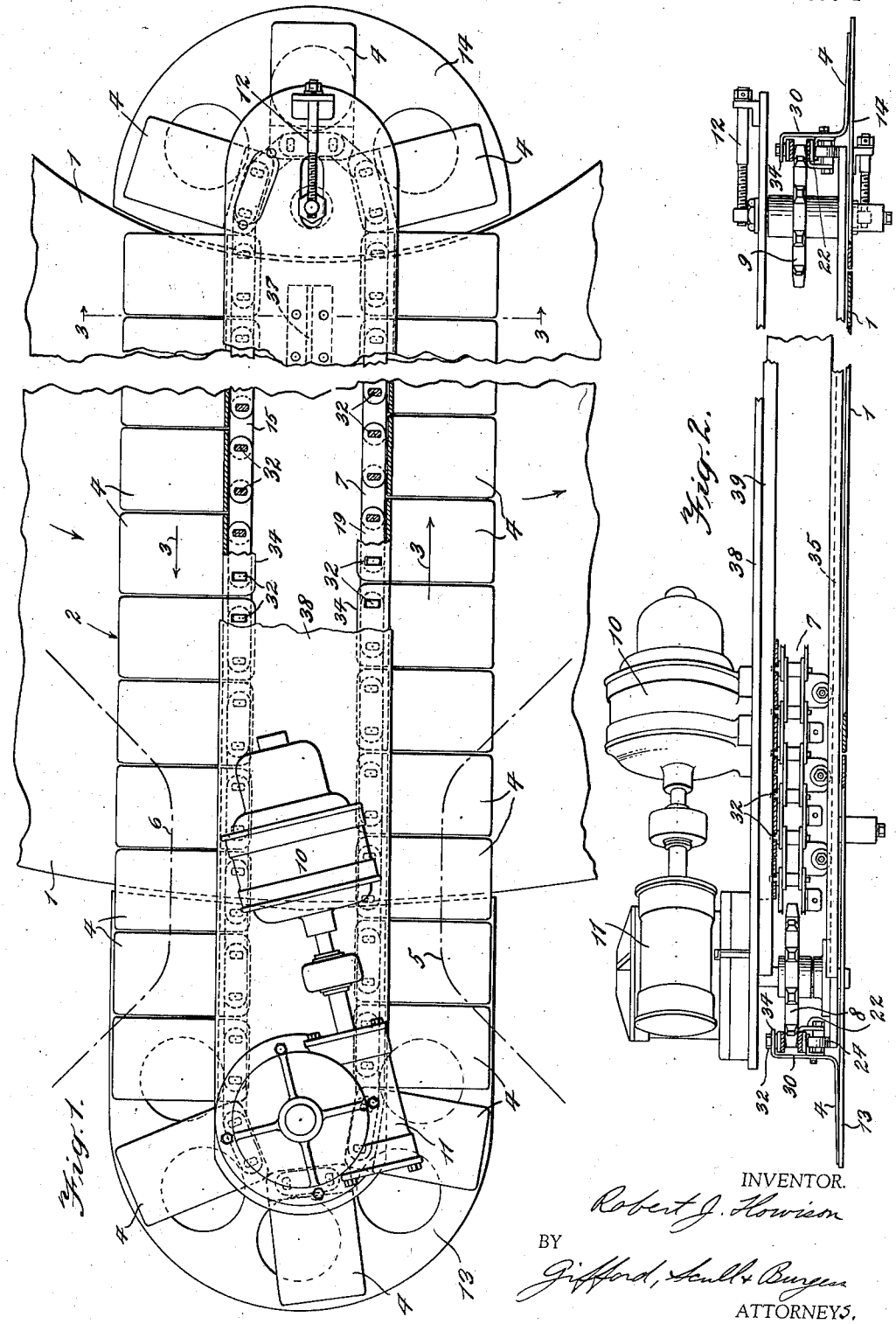

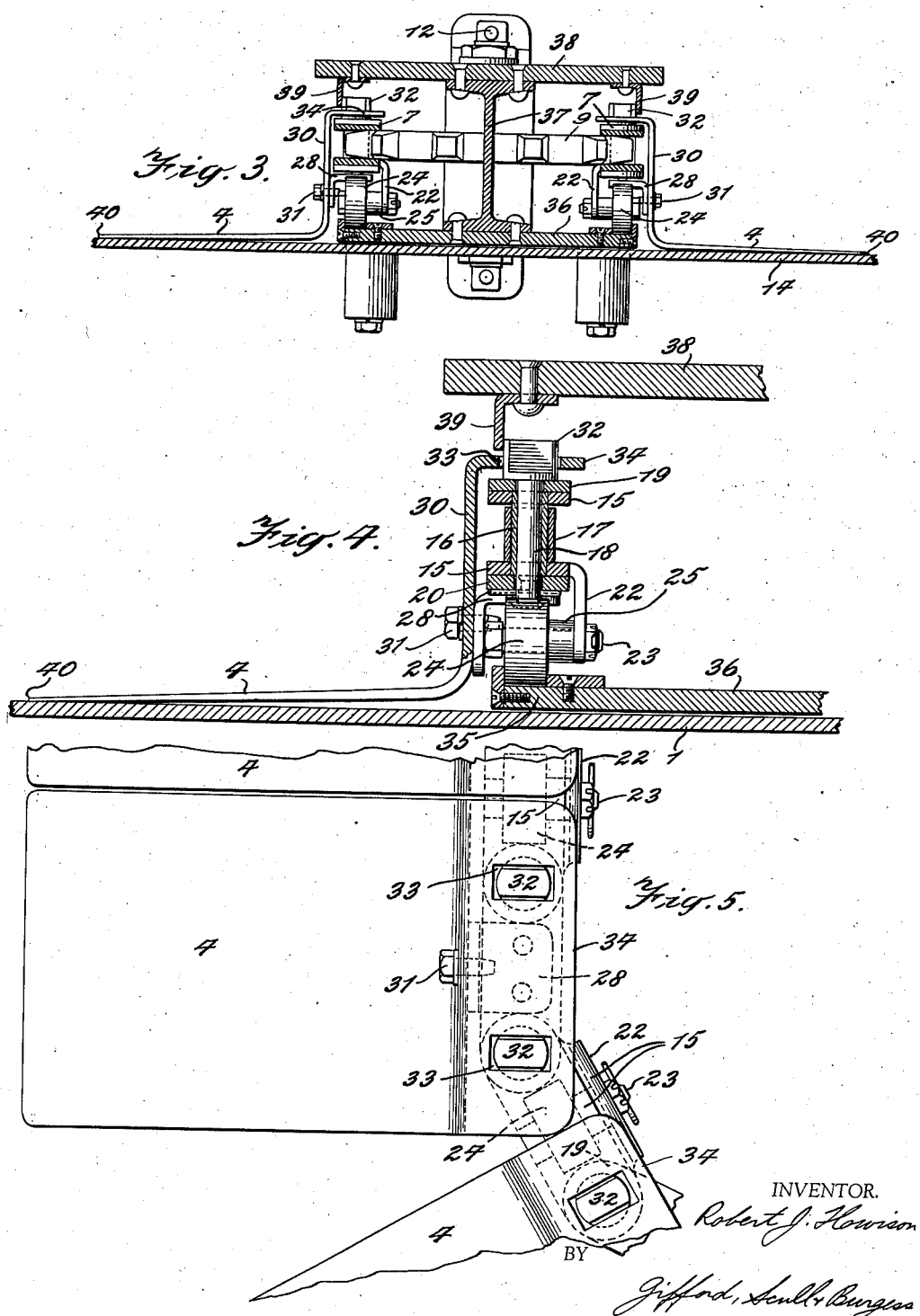

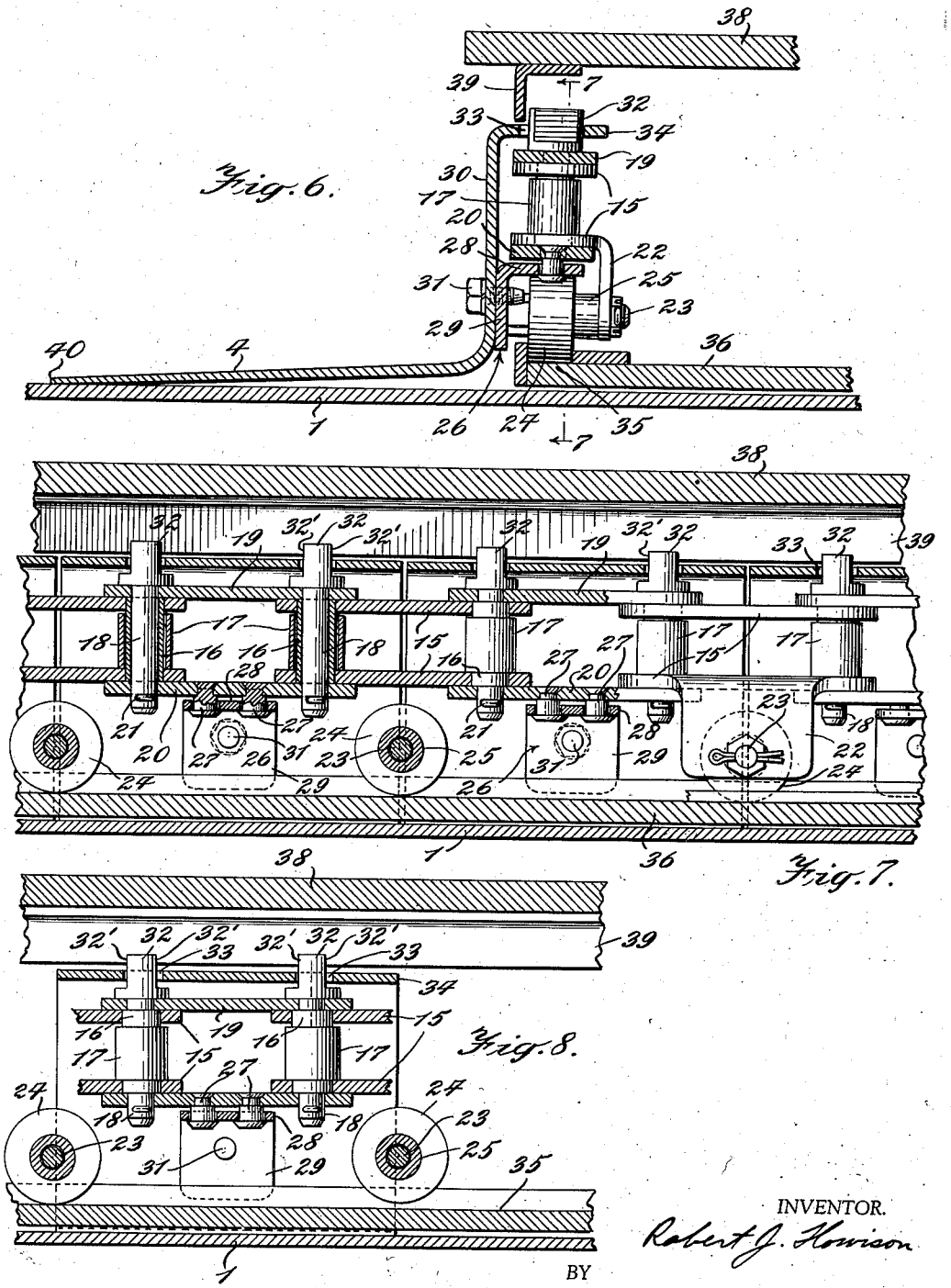

2,057,950

UNITED STATES PATENT OFFICE 2,057,950

CONVEYER CHAIN

Robert J. Howison, Philadelphia, Pa., assignor to The Whitney Chain & Mfg. Company, a corporation of Connecticut Application September 29, 1934, Serial No. 746,059

6 Claims. (Cl. 198—181)

This invention relates to a novel and improved conveyer chain of particular utility in handling bottles or like containers. The novel feature of the invention will be best understood from the following description and the annexed drawings in which I have shown a selected embodiment of the invention and in which:

Fig. 1 is a view partly in plan and partly in section showing one form which the invention may take; Fig. 2 is a view partly in elevation and partly in section of the structure appearing in Fig. 1; Fig. 3 is a section taken approximately on the line 3—3 of Fig. 1; Fig. 4 is a fragmentary view taken on the same general plane as Fig. 3, but showing more of the parts in section and omitting certain parts in order to show details of construction; Fig. 5 is a fragmentary plan view showing the relation of the carrying trays to the chain; Fig. 6 is a view similar to Fig. 4, but showing the parts in slightly different positions with respect to each other; Fig. 7 is a vertical section taken approximately on the line 7—7 of Fig. 6, parts being shown in elevation to better show the details of construction; Fig. 8 is a fragmentary view similar to Fig. 7, but showing the parts in different positions relative to each other.

In Fig. 1 I have shown parts of an apparatus with which the invention has been found to be particularly useful, although it is to be understood that the invention is not limited to that particular type of apparatus. The apparatus referred to may comprise a table 1 mounted to rotate slowly beneath a conveyer designated generally by the numeral 2 and this conveyer moves in the direction of the two arrows indicated at 3 in Fig. 1. This conveyer comprises a plurality of carrying trays 4 to which more detailed reference will be made later. The trays are arranged to have their edges contact with the table 1 as it rotates and in this particular apparatus containers, such as bottles, may be fed on to the conveyer trays and thence on to the table, following some such line as the dot and dash line 5. As the table rotates, the same containers may be moved back on to the conveyer trays and thence off from the table, following some such line as the dot and dash line 6.

It is to the details of the conveyer that my invention relates. The conveyer may comprise an endless chain 7, here shown as of the roller block type, and which is engaged by two sprocket wheels 8 and 9 provided with any usual operating means. In the particular embodiment being described the conveyer is operated by a motor 10 geared to the shaft of the sprocket wheel 8 by suitable gearing in a gear box 11 and the chain may be maintained by any usual tension mechanism, indicated generally at 12. The details of the driving arrangement and the tension arrangement are not necessary to an understanding of my invention and therefore they will not be further described.

Carrying trays 4 pass over fixed tables 13 and 14 at opposite ends of the conveyer and contact therewith in the same manner as they contact with the slowly rotating table 1.

In apparatus of the above described character it has been found that trouble has occurred in handling bottles, or similar containers, and I have devised a chain conveyer which I found works satisfactorily and overcomes the difficulties hitherto experienced.

The type of chain selected for illustration is the roller block type best shown in Fig. 7 and which comprises pitches of links in the form of flat plates pivoted together. The block pitch may comprise the two links 15 connected together by bushings 16 surrounded by rollers 17. These bushings receive pins 18 which pass loosely therethrough and also through aligned holes in the outside plates 19 and 20 of adjoining pitches. Preferably each pin 18 has a press or driving fit in the plate 19 and a sliding fit in the plate 20 and cotter pins 21 may be used to detachably hold the plate 20 in position.

The chain is preferably arranged so that the pins 18 extend in a vertical direction, the tables 1, 13 and 14 normally being horizontal. For the sake of convenience I shall refer to the various parts in the description and claims as though the tables always are horizontal, although it is to be understood that I do not intend by doing so to limit the invention.

The lower ones of the plates 15 of the blocks are used in this illustration to support the chain, this being done in this instance by providing a bracket 22 depending from the lower plate 15 and supporting a shaft 23 on which is rotatably mounted a roller 24. The roller may be held in spaced relation to the bracket by a spacer 25.

In the illustrated embodiment every block pitch is provided with one of the brackets 22 carrying one of the rollers 24 and the intermediate pitches are provided with brackets 26 supported on the plates 20. Each bracket 26 is preferably provided with a loose connection to the plate 20 and this connection in the present instance is provided by means of two rivets 27 held in fixed position in a plate 20 and passing through holes in the upper horizontally extending leg 28 of the bracket 26 and having heads engaging the lower side of that leg. The vertical portion 30 of one of the carrier trays 4 is secured thereto by a single pivot bolt or screw 31 so that the tray may rotate about the pivot. In this particular instance the screw 31 is shown as threaded into the leg 29 and the portion 30 of the tray may rotate on the pivot. At the same time the parts 29 and 30 are held in close engagement with each other.

Limited movement of each tray upon its pivot 31 is permitted by sliding engagement of the head 32 of one of the pins 18 in a slot 33 in a horizontally extending end 34 of the tray. Preferably the head 32 is provided with oppositely disposed flat sides 32', as plainly shown.

In operation the rollers 24 engage a track 35 upon a support 36 which extends over the table 1. Extending upwardly from the support 36 I have shown an I-beam 37 and this I-beam supports a top 38 from which are suspended guides 39 engaging the heads 32 of the pins.

As the conveyer chain moves upon its track or upon the tables 13 and 14 it is supported thereon by the rollers 24 so that it may move with perfect freedom. Ordinarily the heads 32 will be approximately centrally disposed of the slots 33, as shown, for example, in Figs. 4, 5 and 7. The outer edge of the tray 4 will engage the table 1, or the tables 13 or 14, as the case may be, it being noted that the outer edge is relatively thin and normally the bottles or other containers will be moved on and off the trays over these edges. According to my invention these edges will always be in contact with the various tables regardless of any inaccuracy in the various parts of the conveyer, caused by defective workmanship or accumulation of foreign matter, for example.

Referring particularly to Fig. 6, it will be seen that the tray may tip, in a plane parallel to the length of the pivot 31, to a substantial extent from the position shown in Fig. 4 and still have its edge 40 in contact with the table. This arrangement is possible because of the loose connection between the rivets 27 and the leg 28 of the supporting bracket 26. Similarly, looking at Fig. 8 it will be seen that even though one of the rollers 24 be lifted from the track 35, the heads 32 may move to one side of the slots 33, as the tray pivots on its pivot 31. Certain additional pivoting action is also permitted by the loose connection between the rivets 27 and the leg 28.

In addition to the above motions a certain amount of movement of each carrying tray is permitted about the pins 18 so that, all told, there is a floating action of the trays making them independent of the chain which causes their movement. The chain may run freely on its track or over any supporting surface with which it is desirable to have it contact without disturbing the relation of the edge 40 of the tray to the table or tables with which it should contact.

By having the trays of such width, as plainly shown in Figs. 5 and 7, as to extend from the center of one block pitch to the center of the next block pitch, it is possible to use the block pitches to carry the supporting rollers and the outer edges of the trays form a substantially continuous edge during the time when it is necessary to have the containers moving on or off the trays.

While I have shown the invention as embodied in a certain specific form, nevertheless it is to be understood that various changes may be made without departing from the invention, which is defined in the appended claims.

I claim:

1. In combination, a horizontal table, a track disposed above said table, a chain supported on and movable along said track, a plurality of carrying trays having horizontal portions engaging said table and extending outwardly from said chain, horizontal pivots on and extending transversely of said chain, each of said trays being pivotally supported on one of said pivots and movable thereon without disturbing the relation of the tray to the table, and a loose connection between said pivot and said chain permitting tipping of the pivot in a plane parallel to its length lengthwise without disturbing the relation of the tray to the table.

2. In combination, a horizontal table, a track disposed above said table, a chain supported on and movable along said track, a plurality of carrying trays engaging said table and extending outwardly from said chain, horizontal pivots extending transversely of said chain, each of said trays being pivotally supported on one of said pivots, a loose connection between said pivot and said chain permitting tipping of the pivot in a plane parallel to its length, and vertically extending pins on said chain slidably received in horizontally extending slots in said trays, said slots being of greater width than said pins as measured longitudinally of the chain.

3. In combination, a horizontal table, a track disposed above said table, a chain supported on and movable along said track, a plurality of carrying trays engaging said table and extending outwardly from said chain, a loose connection between a tray and said chain permitting tipping of the tray transversely of the chain, and a vertically extending pin on said chain slidably received in a horizontally extending slot in said tray.

4. In combination, a chain pitch comprising parallel plates, a bracket depending from one of said plates, a pivot on said bracket and disposed in a plane parallel to the plates and extending transversely of the chain, and a tray mounted on said pivot, and a pin extending through aligned holes in said plates, said tray having a portion overlying one end of said pin and having a slot slidably receiving said pin end.

5. In combination, a chain pitch comprising parallel plates, a bracket depending from one of said plates, a pivot on said bracket and disposed in a plane parallel to the plates and extending transversely of the chain, and a tray mounted on said pivot, and a pin extending through aligned holes in said plates, said tray having a portion overlying one end of said pin and having a slot slidably receiving said pin end, the width of said slot being greater than the width of the pin.

6. In combination, a chain pitch comprising parallel plates, a bracket depending from one of said plates, a pivot on said bracket and disposed in a plane parallel to the plates and extending transversely of the chain, a tray mounted on said pivot, and a loose connection between said bracket and the plate from which it depends, permitting tipping of the bracket lengthwise of the pivot.

ROBERT J. HOWISON.